United States Patent
Ikeda (10) Patent No.: US 9,405,850 B2
(45) Date of Patent: Aug. 2, 2016

(54) INFORMATION PROCESSING SYSTEM, INFORMATION PROCESSING APPARATUS, CONTROL METHODS THEREFOR, AND STORAGE MEDIUM

(71) Applicant: CANON KABUSHIKI KAISHA, Tokyo (JP)

(72) Inventor: Toru Ikeda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 721 days.

(21) Appl. No.: 13/628,670

(22) Filed: Sep. 27, 2012

(65) Prior Publication Data

US 2013/0110910 A1    May 2, 2013

(30) Foreign Application Priority Data

Oct. 27, 2011 (JP) ................................. 2011-236477

(51) Int. Cl.
*G06F 15/16* (2006.01)
*G06F 17/30* (2006.01)

(52) U.S. Cl.
CPC ................ *G06F 17/30902* (2013.01)

(58) Field of Classification Search
CPC .............................. H04L 41/22; G06F 3/0484
USPC .......................... 709/203, 206, 227, 228, 226
See application file for complete search history.

(56) References Cited

U.S. PATENT DOCUMENTS

| 7,080,158 | B1 * | 7/2006 | Squire | H04L 67/2814 370/389 |
| 2012/0233199 | A1 * | 9/2012 | Jenkins | H04L 29/08729 707/769 |

FOREIGN PATENT DOCUMENTS

| JP | 2006-134261 A | 5/2006 |
| JP | 2006-139687 A | 6/2006 |
| JP | 2010-015432 A | 1/2010 |

OTHER PUBLICATIONS

"A Practical Guide to Data Caching with Zend Server"—Shahar Evron, Zend Technologies, Apr. 2009 https://www.zend.com/topics/Zend-Server-Data-Caching-Whitepaper-0106-T-WP-R1-EN.pdf.*
Japanese Office Action issued in corresponding application No. 2011236477 on Aug. 31, 2015.

* cited by examiner

*Primary Examiner* — Randy Scott
(74) *Attorney, Agent, or Firm* — Carter, DeLuca, Farrell & Schmidt, LLP

(57) ABSTRACT

This invention aims to improve the response characteristics of screen display in an information (image) processing apparatus capable of displaying a screen based on screen data provided from a Web server. The image processing apparatus transmits cache data, which is stored in association with content data acquired from a Web server, to a cache management server together with a user ID in logout of a user. The cache management server stores the cache data, which is received from the image processing apparatus, in association with the user ID. When the user then logs in to any image processing apparatus, the cache management server retrieves the cache data, which is stored in association with the user ID transmitted from the image processing apparatus, and transmits the retrieved cache data to the image processing apparatus.

5 Claims, 8 Drawing Sheets

| ID | FILE SIZE [byte] | STORAGE TIME | ACQUISITION DESTINATION URL |
|---|---|---|---|
| 1 | 125 | 2011/01/01 0:01:10 | http://aaa.co.jp/aaa.html |
| 2 | 450,213 | 2011/01/01 0:02:45 | http://bbb.co.jp/bbb.jpg |
| 3 | 61,451 | 2011/01/01 0:05:21 | http://ccc.co.jp/ccc.gif |
| 4 | 253 | 2011/01/01 0:24:37 | http://ddd.co.jp/ddd.html |
| | | ⋮ | |

FIG. 9

INFORMATION PROCESSING SYSTEM, INFORMATION PROCESSING APPARATUS, CONTROL METHODS THEREFOR, AND STORAGE MEDIUM

BACKGROUND OF THE INVENTION

1. Field of the Invention

The present invention relates to an information processing system, an information processing apparatus, control methods therefor, and a storage medium.

2. Description of the Related Art

A technique in which an information processing apparatus such as a PC is connected to a Web server on a network so that an operation screen provided by the Web server is displayed on a display unit via a Web browser built into the information processing apparatus is generally known. When the Web browser of the information processing apparatus requests of the Web server an operation screen, a Web application on the Web server transmits, to the information processing apparatus in response to the request, an HTML file for displaying an operation screen on the display unit by the Web browser. The Web browser of the information processing apparatus analyzes the received HTML file (screen data) to display an operation screen based on the description of the HTML file. Also, when the user inputs an instruction via the operation screen displayed on the display unit by the Web browser, the Web browser notifies the Web server of the input instruction. The Web application on the Web server executes a process according to the instruction notified by the Web browser of the information processing apparatus.

As a technique of improving the response characteristics of screen display based on screen data provided from a Web server, a technique of caching screen data received from the Web server, for example, can be employed. More specifically, screen data (for example, text data or image data) for screen display, which is received from a Web server, is stored (cached) as cache data by an information processing apparatus. Then, when the information processing apparatus receives an instruction to display a new screen from the user, if screen data corresponding to the screen has been stored as cache data, the information processing apparatus displays the screen based on the cache data. That is, because the use of a cache function allows the information processing apparatus to quickly display a screen based on cache data without requesting of the Web server screen data again, the response characteristics of screen display can improve.

Japanese Patent Laid-Open No. 2010-15432 proposes, for example, a system in which a server apparatus periodically acquires screen information from a Web server based on URL information registered in advance to store it as cache data. The server apparatus transmits the stored cache data to a client apparatus in a good communication state. Because the client apparatus can quickly display a user's desired Web page on a screen using the cache data received from the server apparatus, the operation response characteristics can improve even in the initial stage of connection between the client apparatus and the Web server.

However, in Japanese Patent Laid-Open No. 2010-15432, since the server apparatus acquires cache data associated with URL information registered in advance, it acquires no cache data associated with unregistered URL information, thus making it impossible to improve the operation response characteristics. Hence, in displaying a screen provided from the Web server based on URL information other than URL information registered in advance, it is desired to improve the response characteristics of screen display in accordance with the user-specific screen use mode. Especially for a screen frequently used by the user among screens provided from the Web server, it is desired to improve the response characteristics of screen display by effectively using a cache function.

SUMMARY OF THE INVENTION

The present invention has been made in consideration of the above-mentioned problem. The present invention provides a technique of improving the response characteristics of screen display in accordance with the user-specific screen use mode in an information processing apparatus capable of displaying a screen based on screen data provided from a Web server.

According to one aspect of the present invention, there is provided an information processing system including an information processing apparatus capable of displaying one of a screen based on screen data acquired from a Web server, and a screen based on cache data when the information processing apparatus acquired screen data from the Web server and stored the screen data as the cache data in the past, and a cache management server which manages the cache data stored in the information processing apparatus, the information processing apparatus comprising: a request unit configured to request of the Web server screen data of a screen to be displayed on a display unit of the information processing apparatus, in accordance with an instruction from a user who has logged in to the information processing apparatus; a first storing unit configured to store the screen data, which is acquired from the Web server in response to the request by the request unit, in a storage unit of the information processing apparatus as cache data; a first transmission unit configured to, when a logout process of the user is executed, transmit the cache data stored in the storage unit to the cache management server together with a user ID of the user; and an acquisition unit configured to, when a login process of the user is executed, acquire the cache data of the user, which is stored in the cache management server, by transmitting an acquisition request of the cache data to the cache management server together with the user ID of the user, and store the acquired cache data in the storage unit, and the cache management server comprising: a second storing unit configured to store the cache data in the storage unit of the cache management server in association with the user ID upon receiving the user ID and the cache data transmitted by the first transmission unit; a retrieval unit configured to retrieve, from the cache data stored in a storage unit of the cache management server, cache data which is associated with the user ID received together with the acquisition request, in response to the acquisition request received from the acquisition unit; and a second transmission unit configured to transmit the cache data retrieved by the retrieval unit to the information processing apparatus.

According to another aspect of the present invention, there is provided an information processing system including an information processing apparatus capable of displaying one of a screen based on screen data acquired from a Web server, and a screen based on cache data when the information processing apparatus acquired screen data from the Web server and stored the screen data as the cache data in the past, and a cache management server which manages the cache data stored in the information processing apparatus, the information processing apparatus comprising: a request unit configured to request of the Web server screen data of a screen to be displayed on a display unit of the information processing apparatus, in accordance with an instruction from a user who has logged in to the information processing apparatus; a first storing unit configured to store the screen data, which is acquired from the Web server in response to the request by the request unit, in a storage unit of the information processing apparatus as cache data; a first transmission unit configured to, when a logout process of the user is executed, transmit a cache list, which indicates each cache data and an acquisition destination of the each cache data and is stored in the storage unit, to the cache management server together with a user ID of the user; and an acquisition unit configured to, when a login process of the user is executed, acquire the cache data of the user, which is stored in the cache management server, by transmitting an acquisition request of the cache data to the cache management server together with the user ID of the user, and store the acquired cache data in the storage unit, and the cache management server comprising: a second storing unit configured to store the cache data indicated by the cache list in the storage unit of the cache management server in association with the user ID by acquiring the cache data from a Web server at the acquisition destination indicated by the cache list, upon receiving the user ID and the cache list transmitted by the first transmission unit; a retrieval unit configured to retrieve, from the cache data stored in the storage unit of the cache management server, cache data which is associated with the user ID received together with the acquisition request, in response to the acquisition request received from the acquisition unit; and a second transmission unit configured to transmit the cache data retrieved by the retrieval unit to the information processing apparatus.

According to still another aspect of the present invention, there is provided an information processing apparatus capable of displaying one of a screen based on screen data acquired from a Web server, and a screen based on cache data when the information processing apparatus acquired screen data from the Web server and stored the screen data as the cache data in the past, and communicating with a cache management server which manages the cache data, the apparatus comprising: a request unit configured to request of the Web server screen data of a screen to be displayed on a display unit of the information processing apparatus, in accordance with an instruction from a user who has logged in to the information processing apparatus; a storing unit configured to store the screen data, which is acquired from the Web server in response to the request by the request unit, in a storage unit of the information processing apparatus as cache data; a transmission unit configured to, when a logout process of the user is executed, transmit the cache data stored in the storage unit to the cache management server together with a user ID of the user to store the cache data in the cache management server in association with the user ID of the user; and an acquisition unit configured to, when a login process of the user is executed, acquire the cache data, which is stored in association with the user ID, of the cache data of the user, which is stored in the cache management server, by transmitting an acquisition request of the cache data to the cache management server together with the user ID of the user, and store the acquired cache data in the storage unit.

According to yet another aspect of the present invention, there is provided an information processing apparatus capable of displaying one of a screen based on screen data acquired from a Web server, and a screen based on cache data when the information processing apparatus acquired screen data from the Web server and stored the screen data as the cache data in the past, and communicating with a cache management server which manages the cache data, the apparatus comprising: a request unit configured to request of the Web server screen data of a screen to be displayed on a display unit of the information processing apparatus, in accordance with an instruction from a user who has logged in to the information processing apparatus; a storing unit configured to store the screen data, which is acquired from the Web server in response to the request by the request unit, in a storage unit of the information processing apparatus as cache data; a transmission unit configured to, when a logout process of the user is executed, transmit a cache list, which indicates each cache data and an acquisition destination of the each cache data and is stored in the storage unit, to the cache management server together with a user ID of the user to make the cache management server acquire the cache data indicated by the cache list from a Web server at the acquisition destination indicated by the cache list and store the acquired cache data in association with the user ID; and an acquisition unit configured to, when a login process of the user is executed, acquire the cache data, which is stored in association with the user ID, of the cache data of the user, which is stored in the cache management server, by transmitting an acquisition request of the cache data to the cache management server together with the user ID of the user, and store the acquired cache data in the storage unit.

According to still yet another aspect of the present invention, there is provided a control method for an information processing system including an information processing apparatus capable of displaying one of a screen based on screen data acquired from a Web server, and a screen based on cache data when the information processing apparatus acquired screen data from the Web server and stored the screen data as the cache data in the past, and a cache management server which manages the cache data stored in the information processing apparatus, the method comprising: in the information processing apparatus, requesting of the Web server screen data of a screen to be displayed on a display unit of the information processing apparatus, in accordance with an instruction from a user who has logged in to the information processing apparatus; storing the screen data, which is acquired from the Web server in response to the request in the requesting, in a storage unit of the information processing apparatus as cache data; transmitting the cache data stored in the storage unit to the cache management server together with a user ID of the user when a logout process of the user is executed; and acquiring, by an acquisition unit of the information processing apparatus, the cache data of the user, which is stored in the cache management server, by transmitting an acquisition request of the cache data to the cache management server together with the user ID of the user, and storing the acquired cache data in the storage unit, when a login process of the user is executed, and in the cache management server, storing the cache data in the storage unit of the cache management server in association with the user ID upon receiving the user ID and the cache data transmitted in the transmitting; retrieving, from the cache data stored in the storage unit of the cache management server, cache data which is associated with the user ID received together with the acquisition request, in response to the acquisition request received in the acquiring; and transmitting the cache data retrieved in the retrieving to the information processing apparatus.

According to yet still another aspect of the present invention, there is provided a control method for an information processing system including an information processing apparatus capable of displaying one of a screen based on screen data acquired from a Web server, and a screen based on cache data when the information processing apparatus acquired screen data from the Web server and stored the screen data as the cache data in the past, and a cache management server which manages the cache data stored in the information processing apparatus, the method comprising: in the information processing apparatus, requesting of the Web server screen data of a screen to be displayed on a display unit of the information processing apparatus, in accordance with an instruction from a user who has logged in to the information processing apparatus; storing the screen data, which is acquired from the Web server in response to the request in the requesting, in a storage unit of the information processing apparatus as cache data; transmitting a cache list, which indicates each cache data and an acquisition destination of the each cache data and is stored in the storage unit, to the cache management server together with a user ID of the user, when a logout process of the user is executed; and acquiring the cache data of the user, which is stored in the cache management server, by transmitting an acquisition request of the cache data to the cache management server together with the user ID of the user, and store the acquired cache data in the storage unit, when a login process of the user is executed, and in the cache management server, storing the cache data indicated by the cache list in the storage unit of the cache management server in association with the user ID by acquiring the cache data from a Web server at the acquisition destination indicated by the cache list, upon receiving the user ID and the cache list transmitted in the transmitting; retrieving, from the cache data stored in the storage unit of the cache management server, cache data which is associated with the user ID received together with the acquisition request, in response to the acquisition request received in the acquiring; and transmitting the cache data retrieved in the retrieving to the information processing apparatus.

According to still yet another aspect of the present invention, there is provided a control method for an information processing apparatus capable of displaying one of a screen based on screen data acquired from a Web server, and a screen based on cache data when the information processing apparatus acquired screen data from the Web server and stored the screen data as the cache data in the past, and communicating with a cache management server which manages the cache data, the method comprising: requesting of the Web server screen data of a screen to be displayed on a display unit of the information processing apparatus, in accordance with an instruction from a user who has logged in to the information processing apparatus; storing the screen data, which is acquired from the Web server in response to the request in the requesting, in a storage unit of the information processing apparatus as cache data; transmitting the cache data stored in the storage unit to the cache management server together with a user ID of the user to store the cache data in the cache management server in association with the user ID of the user, when a logout process of the user is executed; and acquiring the cache data, which is stored in association with the user ID, of the cache data of the user, which is stored in the cache management server, by transmitting an acquisition request of the cache data to the cache management server together with the user ID of the user, and store the acquired cache data in the storage unit, when a login process of the user is executed.

According to yet still another aspect of the present invention, there is provided a control method for an information processing apparatus capable of displaying one of a screen based on screen data acquired from a Web server, and a screen based on cache data when the information processing apparatus acquired screen data from the Web server and stored the screen data as the cache data in the past, and communicating with a cache management server which manages the cache data, the method comprising: requesting of the Web server screen data of a screen to be displayed on a display unit of the information processing apparatus, in accordance with an instruction from a user who has logged in to the information processing apparatus; storing the screen data, which is acquired from the Web server in response to the request in the requesting, in a storage unit of the information processing apparatus as cache data; transmitting a cache list, which indicates each cache data and an acquisition destination of the each cache data and is stored in the storage unit, to the cache management server together with a user ID of the user to make the cache management server acquire the cache data indicated by the cache list from a Web server at the acquisition destination indicated by the cache list and store the cache data in association with the user ID, when a logout process of the user is executed; and acquiring the cache data, which is stored in association with the user ID, of the cache data of the user, which is stored in the cache management server, by transmitting an acquisition request of the cache data to the cache management server together with the user ID of the user, and store the acquired cache data in the storage unit, when a login process of the user is executed.

According to the present invention, it is possible to provide a technique of improving the response characteristics of screen display in accordance with the user-specific screen use mode in an information processing apparatus capable of displaying a screen based on screen data provided from a Web server. This makes it possible to improve the user operability in the information processing apparatus.

Further features of the present invention will become apparent from the following description of exemplary embodiments with reference to the attached drawings.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First Embodiment

System Configuration of Image Processing System

The configuration of an image processing system according to the first embodiment of the present invention will be described first with reference to FIG. 1. An information processing system according to the present invention will be described in this embodiment by taking an image processing system including an image processing apparatus as an example. The image processing system shown in FIG. 1 includes image processing apparatuses 100 and 103, a Web server 120, and a cache management server 122, which can communicate with each other via a network.

The image processing apparatuses 100 and 103 are connected to a LAN (Local Area Network) 101, and connected to the Internet 110 via the LAN 101. The Web server 120 including a Web application is connected to a LAN 121 different from the LAN 101, and connected to the Internet 110 via the LAN 121. The Web server 120 provides the function of the Web application to the image processing apparatuses 100 and 103 via networks (LANs 101 and 121 and Internet 110). The cache management server 122 which manages cache data transmitted from the image processing apparatuses 100 and 103 is connected to a LAN 123 different from the LANs 101 and 121, and connected to the Internet 110 via the LAN 123.

Figure 1:
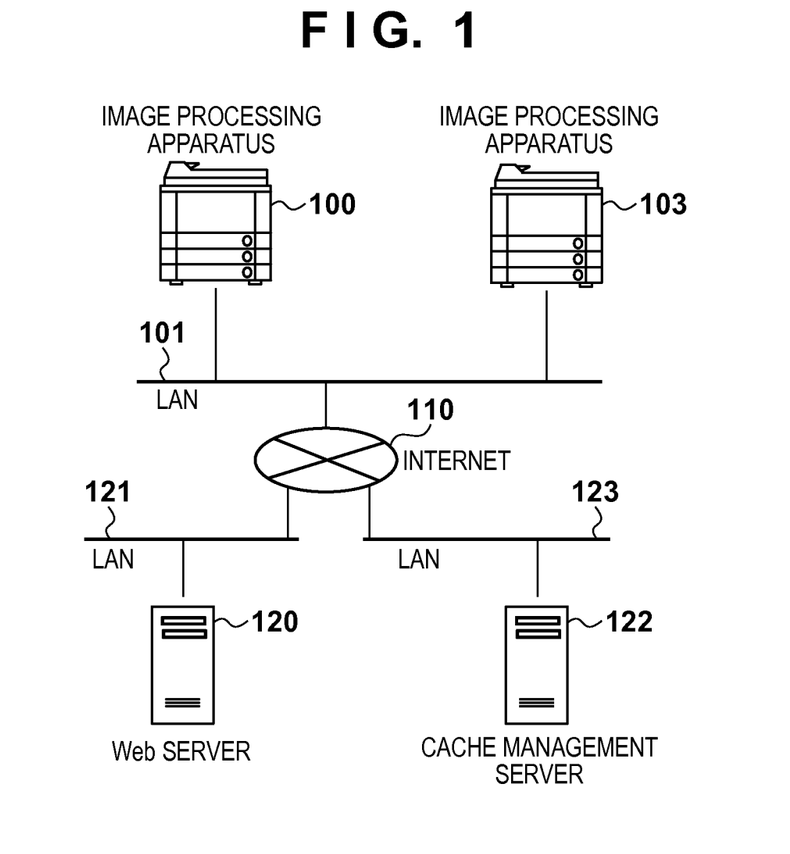
FIG. 1 is a view showing the configuration of an image processing system according to the first embodiment.

In this embodiment, as shown in FIG. 1, the image processing apparatuses 100 and 103, Web server 120, and cache management server 122 are connected to the different LANs 101, 121, and 123, respectively, but may be connected to the same LAN.

<Hardware Configurations of Image Processing Apparatuses 100 and 103>

Figure 2:
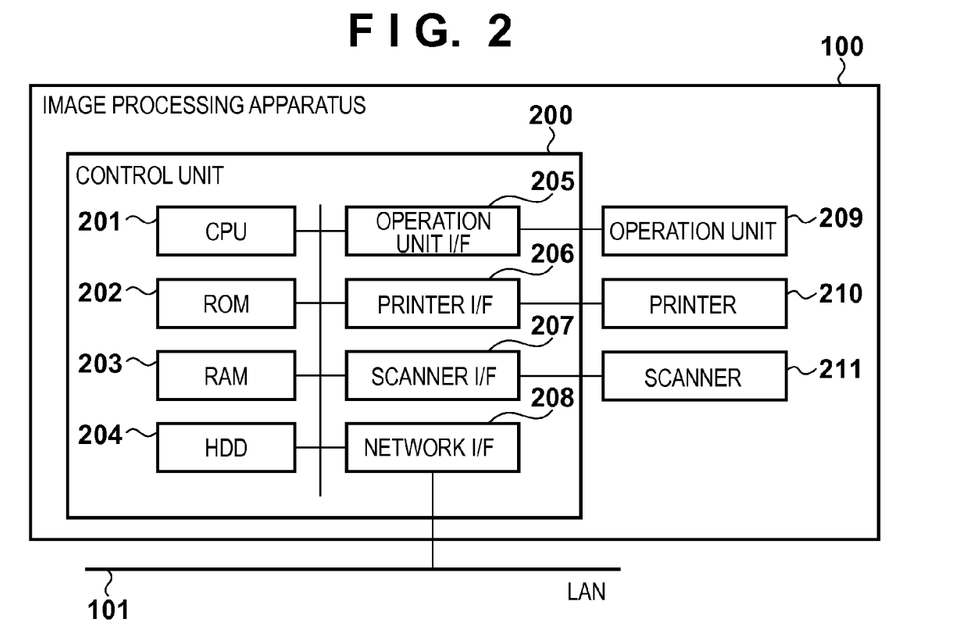
FIG. 2 is a block diagram showing the hardware configuration of an image processing apparatus 100 according to the first embodiment.

The hardware configuration of the image processing apparatus 100 according to the first embodiment will be described with reference to FIG. 2. Note that the image processing apparatus 103 has the same hardware configuration as the image processing apparatus 100. The image processing apparatus 100 includes a control unit 200, and an operation unit 209, printer 210, and scanner 211 connected to the control unit 200.

The control unit 200 includes a CPU 201 and controls the operation of the overall image processing apparatus 100. The CPU 201 implements various types of control such as reading control and transmission control by reading out a control program stored in a ROM 202 into a RAM 203, and executing it. The ROM 202 stores a system boot program and various control programs, and functions as a boot ROM. The RAM 203 is used as a temporary storage area such as the main memory or work area of the CPU 201. An HDD (Hard Disc Drive) 204 stores, for example, image data, various programs, and various information tables.

An operation unit interface (I/F) 205 is an interface for connecting the operation unit 209 and the control unit 200 to each other. The operation unit 209 includes, for example, a keyboard or a liquid crystal display unit having a touch panel function, and functions as a display device and an input device. A printer I/F 206 is an interface for connecting the printer 210 and the control unit 200 to each other. Image data used in printing by the printer 210 is transferred from the control unit 200 to the printer 210 via the printer I/F 206. The printer 210 prints on a printing medium an image corresponding to the image data transferred from the control unit 200. A scanner I/F 207 is an interface for connecting the scanner 211 and the control unit 200 to each other. The scanner 211 reads an image on a document to generate image data corresponding to the read image, and inputs the generated image data to the control unit 200 via the scanner I/F 207.

A network I/F 208 is an interface for connecting the control unit 200 to the LAN 101. The network I/F 208 can transmit/receive information (data) to/from external apparatuses connected to the Internet 110 (and other LANs connected to the Internet 110) via the LAN 101.

<Hardware Configurations of Web Server 120 and Cache Management Server 122>

Figure 3:
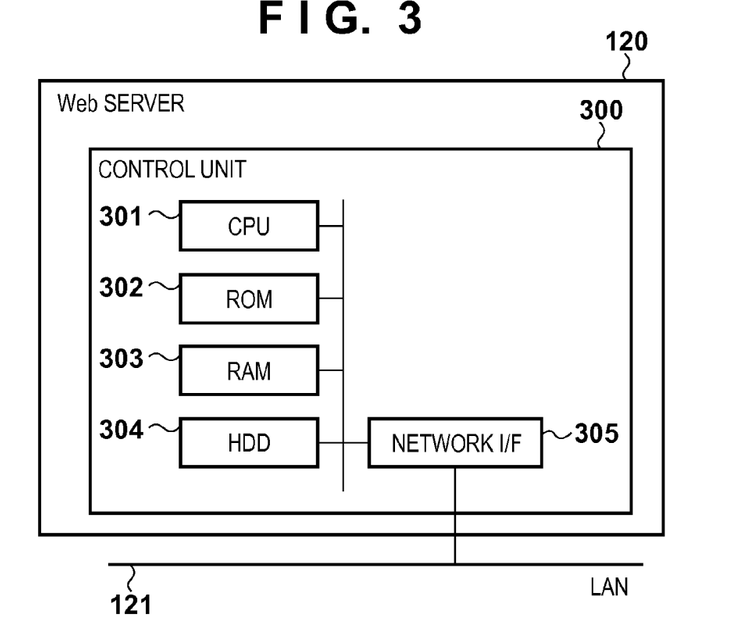
FIG. 3 is a block diagram showing the hardware configurations of a Web server 120 and cache management server 122 according to the first embodiment.

The hardware configurations of the Web server 120 and cache management server 122 according to the first embodiment will be described with reference to FIG. 3. Although FIG. 3 illustrates the hardware configuration of the Web server 120, the cache management server 122 has the same configuration.

The Web server 120 includes a control unit 300, which controls the operation of the overall Web server 120. The control unit 300 includes a CPU 301. The CPU 301 implements various types of control by reading out a control program stored in a ROM 302 into a RAM 303, and executing it. The ROM 302 stores a system boot program and various control programs, and functions as a boot ROM. The RAM 303 is used as a temporary storage area such as the main memory or work area of the CPU 301. An HDD 304 stores, for example, image data, various programs, and cache data. The HDD 304 especially stores content data (screen data) of a screen (for example, an operation screen) displayed on the operation unit 209 of each of the image processing apparatuses 100 and 103.

A network I/F 305 is an interface for connecting the control unit 300 to the LAN 121. The network I/F 305 can transmit/receive information (data) to/from other apparatuses on the LAN 121 or external apparatuses connected to the Internet 110 (and other LANs connected to the Internet 110) via the LAN 121.

<Software Configuration of Image Processing System>

Figure 4:
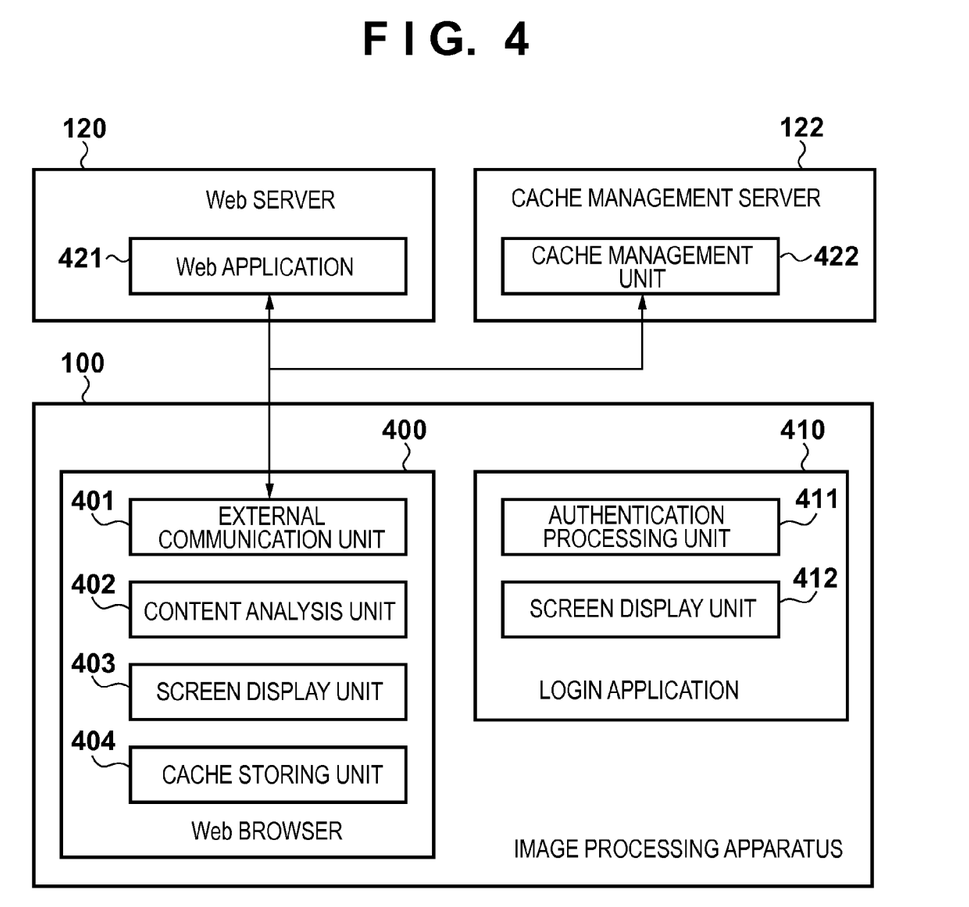
FIG. 4 is a block diagram showing the software configuration of the image processing system according to the first embodiment.

The software configuration of the image processing system including the image processing apparatuses 100 and 103, Web server 120, and cache management server 122 according to the first embodiment will be described with reference to FIG. 4. Note that the image processing apparatus 103 has the same software configuration as the image processing apparatus 100 shown in FIG. 4, and only the image processing apparatus 100 will be described below. Each functional unit of the image processing apparatus 100 or 103 shown in FIG. 4 is implemented on the image processing apparatus 100 or 103 by making the CPU 201 read out and execute a control program stored in the ROM 202 or the HDD 204. Also, each functional unit of the Web server 120 and cache management server 122 is implemented on the Web server 120 and cache management server 122 by making the CPU 301 read out and execute a control program stored in the ROM 302 or the HDD 304.

(Web Server 120)

The Web server 120 includes a Web application 421. When the Web application 421 receives a request from a Web browser 400 of the image processing apparatus 100, it processes content data and transmits the processed content data to the image processing apparatus 100 in response to the request. In this embodiment, the content data means screen data such as HTML data or image data used by the Web browser 400 to display a screen (for example, an operation screen) on the operation unit 209 in the image processing apparatus 100.

(Cache Management Server 122)

The cache management server 122 includes a cache management unit 422. The cache management unit 422 stores cache data and user ID received from the image processing apparatus 100 in the RAM 303 or the HDD 304 in association with each other to manage the cache data for each user. Also, the cache management server 122 retrieves cache data stored in the RAM 303 or the HDD 304 in response to a request from the image processing apparatus 100, and transmits it to the image processing apparatus 100 in response to the request.

(Image Processing Apparatuses 100 and 103)

The image processing apparatus 100 includes the Web browser 400 and a login application 410. The Web browser 400 is an internal software program installed on the image processing apparatus 100, and includes an external communication unit 401, content analysis unit 402, screen display unit 403, and cache storing unit 404.

The external communication unit 401 communicates with the Web server 120 via a network to use the Web application 421. More specifically, the external communication unit 401 transmits, to the Web application 421 (Web server 120) via a network, a content acquisition request for the Web application 421 from the Web server 120. In response to the content acquisition request, the external communication unit 401 receives content data transmitted from the Web application 421 (Web server 120). Also, the external communication unit 401 transmits/receives cache data to/from the cache management server 122 via a network. The content analysis unit 402 analyzes the content data acquired from the Web server 120 by the external communication unit 401 to generate screen data of a screen to be displayed on the operation unit 209. The screen display unit 403 displays a corresponding screen on the operation unit 209 based on the screen data generated by the content analysis unit 402.

When the external communication unit 401 acquires content data (text data or image data) from the Web server 120, the cache storing unit 404 stores the acquired content data in the RAM 203 or the HDD 204 as cache data. Also, the cache storing unit 404 manages a cache list corresponding to a list of cache data stored in the RAM 203 or the HDD 204. The cache storing unit 404 stores the cache list in the RAM 203 or the HDD 204, as in the case of the cache data. When the cache storing unit 404 stores cache data in the RAM 203 or the HDD 204 or deletes cache data from the RAM 203 or the HDD 204, it updates the contents of the cache list.

The Web browser 400 not only has the above-mentioned functions but also accepts instructions from the user, such as an instruction to switch the screen to be displayed on the operation unit 209, via the operation unit 209, as will be described later. That is, the Web browser 400 accepts an acquisition instruction of screen data (content data) of a screen (for example, an operation screen), to be newly displayed on the operation unit 209, from a user who has logged in to the image processing apparatus 100 via the operation unit 209. Upon accepting the screen acquisition instruction, the Web browser 400 determines whether content data designated by the instruction has already been stored (cached) in the RAM 203 or the HDD 204 as cache data. If it is determined that the required content data has been cached in the RAM 203 or the HDD 204, a screen can be displayed on the operation unit 209 using the cache data without newly acquiring content data from the Web server 120. The Web browser 400 can improve the response characteristics of screen display using such a cache function.

The login application 410 is an internal software program installed on the image processing apparatus 100, and includes an authentication processing unit 411 and screen display unit 412. The authentication processing unit 411 uses authentication information input using the operation unit 209 by a user to perform a login process of the user, and performs a logout process of the user when the user inputs a logout instruction using the operation unit 209. The screen display unit 412 displays on the operation unit 209 an authentication screen for prompting the user to input authentication information to perform a login process. Also, the screen display unit 412 displays on the operation unit 209 a logout instruction screen for prompting the user to input a logout instruction.

<Process Executed by Image Processing System>

Figure 5:
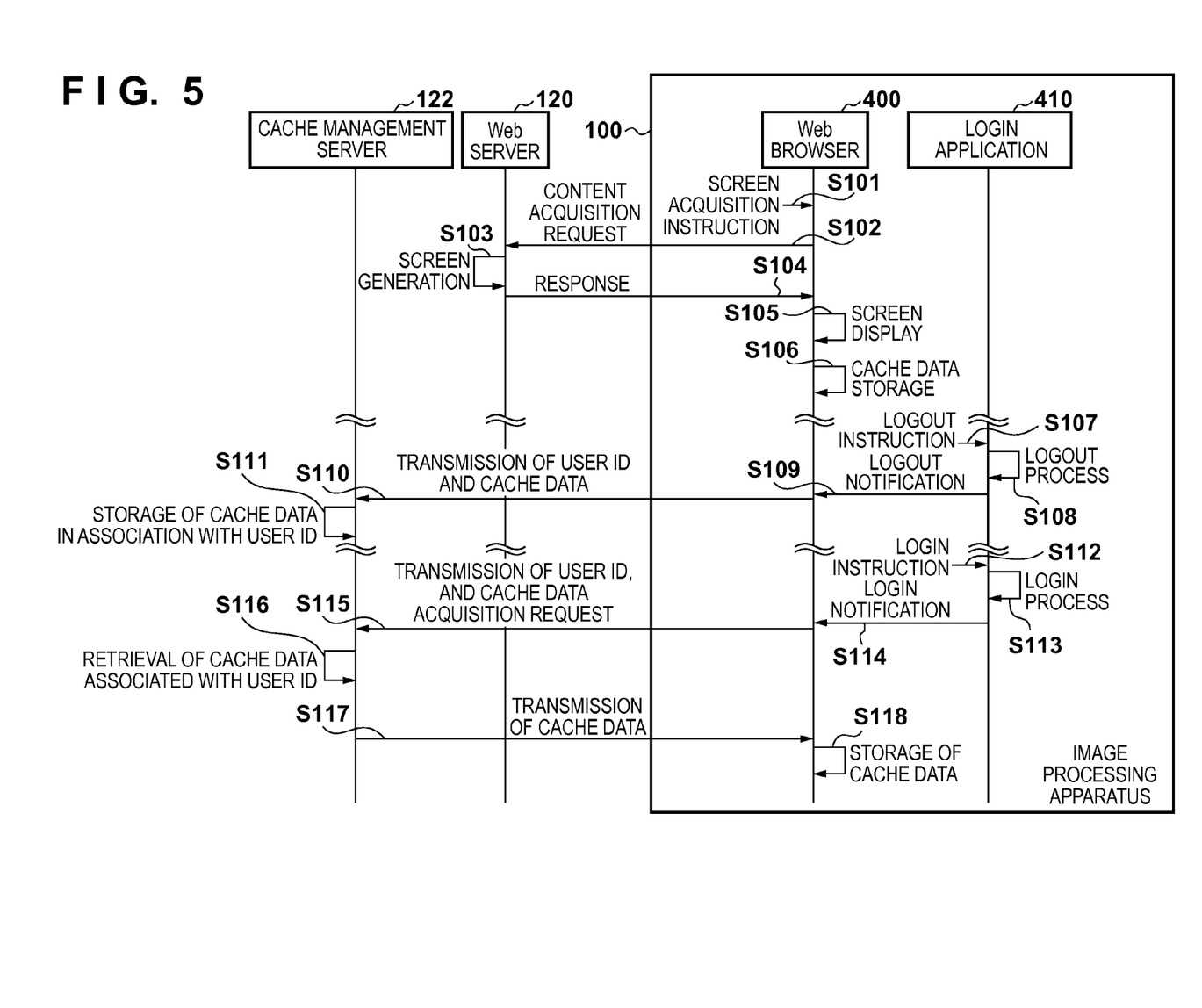
FIG. 5 is a sequence chart showing a process executed by the image processing system according to the first embodiment.

A series of processes executed by the image processing system according to this embodiment will be described next with reference to FIG. 5. Although FIG. 5 illustrates a process executed by the image processing apparatus 100 of the image processing apparatuses 100 and 103, the same applies to a process executed by the image processing apparatus 103. An operation in each step shown in FIG. 5 is implemented on the image processing apparatus 100 or 103, the Web server 120, and the cache management server 122 by making the CPU 201 read out and execute a control program stored in the ROM 202 or the HDD 204, and making the CPU 301 read out and execute a control program stored in the ROM 302 or the HDD 304.

In this embodiment, when a logout process of a user is executed, the image processing apparatus 100 or 103 transmits the stored cache data to the cache management server 122 together with the user ID of the user. Then, when a login process of a user is executed, the image processing apparatus 100 or 103 transmits the user ID of the logged-in user to the cache management server 122 to receive cache data of the user from the cache management server 122.

First, in step S101, the Web browser 400 accepts an acquisition instruction (screen acquisition instruction) of screen data (content data) of a screen (for example, an operation screen), to be newly displayed on the operation unit 209, via the operation unit 209 from a user who has logged in to the image processing apparatus 100. The Web browser 400 accepts, as an instruction from the user, for example, input of a URL indicating the address of content data on a network, selection of a link destination URL displayed on the operation unit 209, or selection of a favorite registered in correspondence with a link destination URL.

If content data designated by the screen acquisition instruction accepted in step S101 has already been stored in the RAM 203 or the HDD 204 as cache data, the Web browser 400 displays a screen on the operation unit 209 using the cache data. More specifically, the Web browser 400 makes the screen display unit 403 display on the operation unit 209 a screen based on cache data read out from the RAM 203 or the HDD 204. In this case, since there is no need to acquire content data from the Web server 120, the process advances to step S105 without executing processes in step S102 to S104.

On the other hand, if no cache data corresponding to content data designated by the screen acquisition instruction accepted in step S101 is present in the RAM 203 or the HDD 204, the Web browser 400 executes a process in step S102. In step S102, the external communication unit 401 transmits, to a Web server (the Web server 120 in this case) specified by a URL designated by the screen acquisition instruction accepted in step S101, an acquisition request of a content specified by the URL.

When the Web server 120 receives the content acquisition request, it executes a process in step S103. In step S103, the Web application 421 of the Web server 120 reads out content data, specified by the URL designated by the received acquisition request, among content data stored in the HDD 304. The Web application 421 then processes the readout content data into data for displaying a screen on the operation unit 209 of the image processing apparatus 100 to generate a screen for display in the image processing apparatus 100. In step S104, the Web application 421 transmits the generated content data to the external communication unit 401 of the image processing apparatus 100 (Web browser 400) in response to the content acquisition request. The process then advances from step S104 to step S105.

If the external communication unit 401 receives content data from the Web application 421, in step S105 the content analysis unit 402 analyzes the received content data to generate screen data for display on the operation unit 209. The screen display unit 403 displays on the operation unit 209 a screen based on the screen data generated by the content analysis unit 402. In step S106, the cache storing unit 404 stores (caches), in the RAM 203 or the HDD 204 as cache data, content data (for example, text data or image data) corresponding to the screen displayed on the operation unit 209 in step S105. Note that if content data corresponding to the screen displayed on the operation unit 209 in step S105 has already been cached as cache data, the cache storing unit 404 need not cache the content data again. In step S106, the cache storing unit 404 functions as a first storing unit.

Assume that the logged-in user then instructs to execute a logout process at a given timing. In step S107, the login application 410 accepts a logout instruction from the user via the operation unit 209. More specifically, when the user inputs a logout instruction via a logout instruction screen displayed on the operation unit 209 by the screen display unit 412, the login application 410 starts a logout process of the user. In step S108, the authentication processing unit 411 executes a logout process to end the application in use in the image processing apparatus 100. In step S109, the authentication processing unit 411 transmits a completion notification that the logout process of the user is complete to the Web browser 400. At this time, the authentication processing unit 411 notifies the Web browser 400 of a user ID corresponding to an identifier (ID) for identifying the logged-out user, together with the completion notification.

When the Web browser 400 receives the completion notification of the logout process from the login application 410, it executes a process in step S110. In step S110, the external communication unit 401 transmits the cache data, which is stored in the RAM 203 or the HDD 204, to the cache management server 122 together with the user ID notified in step S109. In step S110, the external communication unit 401 functions as a first transmission unit.

When the cache management server 122 receives the cache data from the image processing apparatus 100 together with the user ID in step S110, it executes a process in step S111. In step S111, the cache management unit 422 stores the user ID and cache data received in step S110 in the RAM 303 or the HDD 304 in association with each other. In step S111, the cache management unit 422 functions as a second storing unit.

Assume that the user who has logged out in step S109 then logs in to the image processing apparatus 100 again at a given timing. In step S112, the login application 410 accepts a login instruction from the user. More specifically, when the user inputs authentication information via an authentication screen displayed on the operation unit 209 by the screen display unit 412, the login application 410 starts a login process of the user. In step S113, the authentication processing unit 411 executes a login process of the user to start an application corresponding to the authenticated user. In step S114, the authentication processing unit 411 transmits a completion notification that the login process of the user is complete to the Web browser 400. At this time, the authentication processing unit 411 notifies the Web browser 400 of a user ID for identifying the logged-in user, together with the completion notification.

When the Web browser 400 receives the completion notification of the login process from the login application 410, it executes a process in step S115. In step S115, the external communication unit 401 transmits a cache data acquisition request to the cache management server 122 together with the user ID notified in step S114.

When the cache management server 122 receives the cache data acquisition request from the image processing apparatus 100 together with the user ID, it executes a process in step S116. In step S116, the cache management unit 422 retrieves, from the cache data stored in the RAM 303 or the HDD 304 in step S111, cache data associated with the user ID received from the image processing apparatus 100 in step S115. After the retrieval process is completed, in step S117 the cache management unit 422 transmits to the Web browser 400 the cache data obtained by the retrieval process in step S116. In step S117, the cache management unit 422 functions as a second transmission unit.

When the Web browser 400 receives the cache data from the cache management server 122, it executes a process in step S118. In step S118, the cache storing unit 404 stores the cache data received in step S117 in the RAM 203 or the HDD 204.

When the Web browser 400 accepts a screen acquisition instruction during user login (step S101), it displays a screen on the operation unit 209 using the cache data stored in the RAM 203 or the HDD 204. On the other hand, if content data designated by the screen acquisition instruction has not been stored in the RAM 203 or the HDD 204 as cache data, the Web browser 400 transmits a content acquisition request to the Web server 120 (step S102), as described above. The Web browser 400 then displays on the operation unit 209 a screen based on the content data acquired from the Web server 120.

In this embodiment, the image processing apparatus 100 transmits cache data, which is stored in association with content data acquired from the Web server 120, to the cache management server 122 together with a user ID in logout of the logged-in user, as described above. The cache management server 122 stores the cache data received from the image processing apparatus 100 in association with the user ID. When the user then logs in to any image processing apparatus, the cache management server 122 transmits the cache data stored in association with the user ID to the image processing apparatus, based on the user ID and cache data acquisition request transmitted from the image processing apparatus.

According to this embodiment, even when, for example, a user who usually uses the image processing apparatus 100 uses the different image processing apparatus 103, user-specific cache data stored in the cache management server 122 can be used, as in the case of the image processing apparatus 100. That is, in all image processing apparatuses to which the user can log in, the user can use the same cache data to allow the frequently used operation screen to be quickly displayed and switched. In this manner, in the image processing apparatus 100 capable of displaying a screen based on screen data provided from the Web server, the response characteristics of screen display can be improved in accordance with the user-specific screen use mode.

Also, in this embodiment, the cache management server 122 manages cache data for each user. Hence, even if cache data is erased as, for example, a user other than a specific user uses the image processing apparatus 100, the cache data can be restored from the cache management server 122 when the specific user logs in to the image processing apparatus 100.

That is, the specific user can use again cache data used during the previous login session to enable display and switch of the operation screen, thereby improving the response characteristics of screen display.

Note that the following modification to this embodiment is possible. The image processing apparatus 100 or 103 may be able to arbitrarily restrict transmission and reception of cache data to and from the cache management server 122, in accordance with a user instruction. For example, the image processing apparatus 100 displays on the operation unit 209 an operation screen capable of setting whether cache data is to be transmitted to the cache management server 122 in logout of the user. Also, the image processing apparatus 100 displays on the operation unit 209 an operation screen capable of setting whether cache data is to be received from the cache management server 122 in login of the user. The image processing apparatus 100 determines operations after the notification processes in steps S109 and S114, depending on the details set by the user via these operation screens. That is, the image processing apparatus 100 restricts execution of a process in step S110 (step S115) when setting is performed not to transmit (receive) cache data. This allows setting that fits user's needs for exchange of cache data between the image processing apparatus 100 and the cache management server 122.

Second Embodiment

The second embodiment of the present invention is characterized in that when a user logs in to an image processing apparatus 100 or 103, a cache management server 122 transmits only cache data which is not held in the image processing apparatus 100 or 103. Note that only features different from the first embodiment will be described below for the sake of simplicity.

Figure 6:
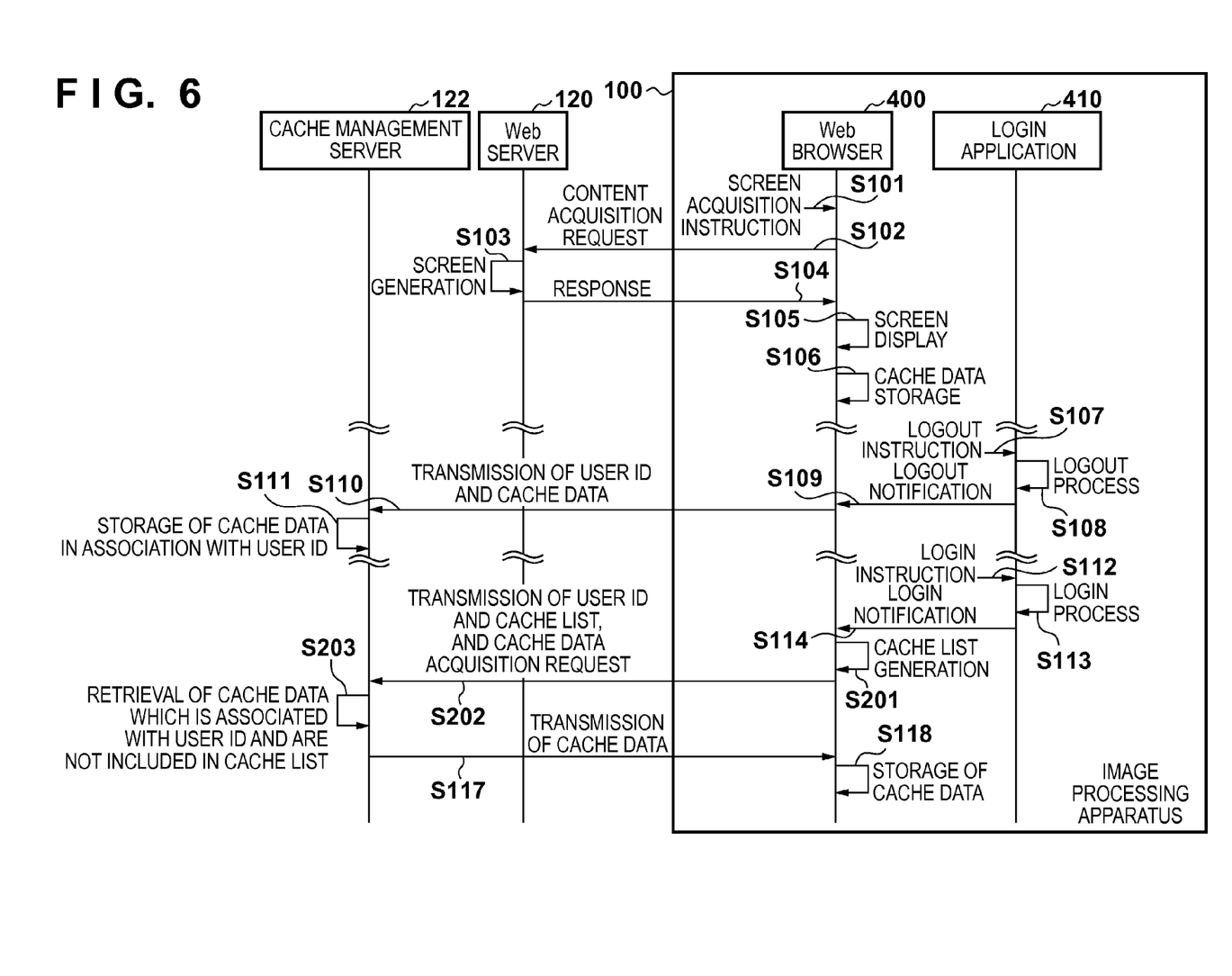
FIG. 6 is a sequence chart showing a process executed by an image processing system according to the second embodiment.

A series of processes executed by an image processing system according to this embodiment will be described with reference to FIG. 6. Although FIG. 6 illustrates a process executed by the image processing apparatus 100 of the image processing apparatuses 100 and 103, the same applies to a process executed by the image processing apparatus 103. An operation in each step shown in FIG. 6 is implemented on the image processing apparatus 100 or 103, a Web server 120, and the cache management server 122 by making a CPU 201 read out and execute a control program stored in a ROM 202 or an HDD 204, and making a CPU 301 read out and execute a control program stored in a ROM 302 or an HDD 304.

The same reference numerals as in the first embodiment (FIG. 5) denote steps in which the same processes are executed in FIG. 6. More specifically, steps S101 to S114, S117, and S118 are the same as in the first embodiment, and a description thereof will not be given as much as possible.

In this embodiment, when a Web browser 400 receives a completion notification of a login process from a login application 410 in step S114, it executes a process in step S201. In step S201, a cache storing unit 404 of the Web browser 400 creates a list of cache data stored in a RAM 203 and the HDD 204 as a cache list. In step S202, an external communication unit 401 transmits a cache data acquisition request and the cache list created in step S201 to the cache management server 122 together with the user ID notified in step S114.

When the cache management server 122 receives the cache data acquisition request and cache list from the image processing apparatus 100, it executes a process in step S203. In step S203, a cache management unit 422 retrieves cache data associated with the user ID received in step S202 from the cache data stored in a RAM 303 or the HDD 304 in step S111. At this time, the cache management unit 422 excludes cache data included in the cache list received in step S202 from targets to be retrieved.

That is, in step S203, the cache management unit 422 retrieves cache data which is associated with the user ID and is not included in the cache list. After the retrieval process is completed, in step S117 the cache management unit 422 transmits to the Web browser 400 the cache data obtained by the retrieval process in step S203. The image processing apparatus 100 then stores and uses the cache data received from the cache management server 122, as in the first embodiment.

In this embodiment, the cache management server 122 uses a cache list received from an image processing apparatus to which the user has logged in to limit cache data to be retrieved, which are to be transmitted to the image processing apparatus, as described above. More specifically, the cache management server 122 excludes, from targets to be retrieved, cache data included in a cache list received from an image processing apparatus to which the user has logged in, thereby excluding cache data which has already been held in the image processing apparatus from targets to be transmitted. That is, the cache management server 122 transmits, to an image processing apparatus to which the user has logged in, only cache data which has not been held in the image processing apparatus. Hence, according to the second embodiment, it is possible to reduce the amount of cache data to be transmitted from the cache management server 122 to the image processing apparatus 100 or 103, in addition to the advantage as in the first embodiment.

Third Embodiment

The third embodiment of the present invention is characterized in that a cache management server 122 adjusts the amount of cache data to be transmitted, in consideration of the storage capacity of cache data in each of image processing apparatuses 100 and 103 to which cache data is to be transmitted. Note that only features different from the first and second embodiments will be described below for the sake of simplicity.

Figure 7:
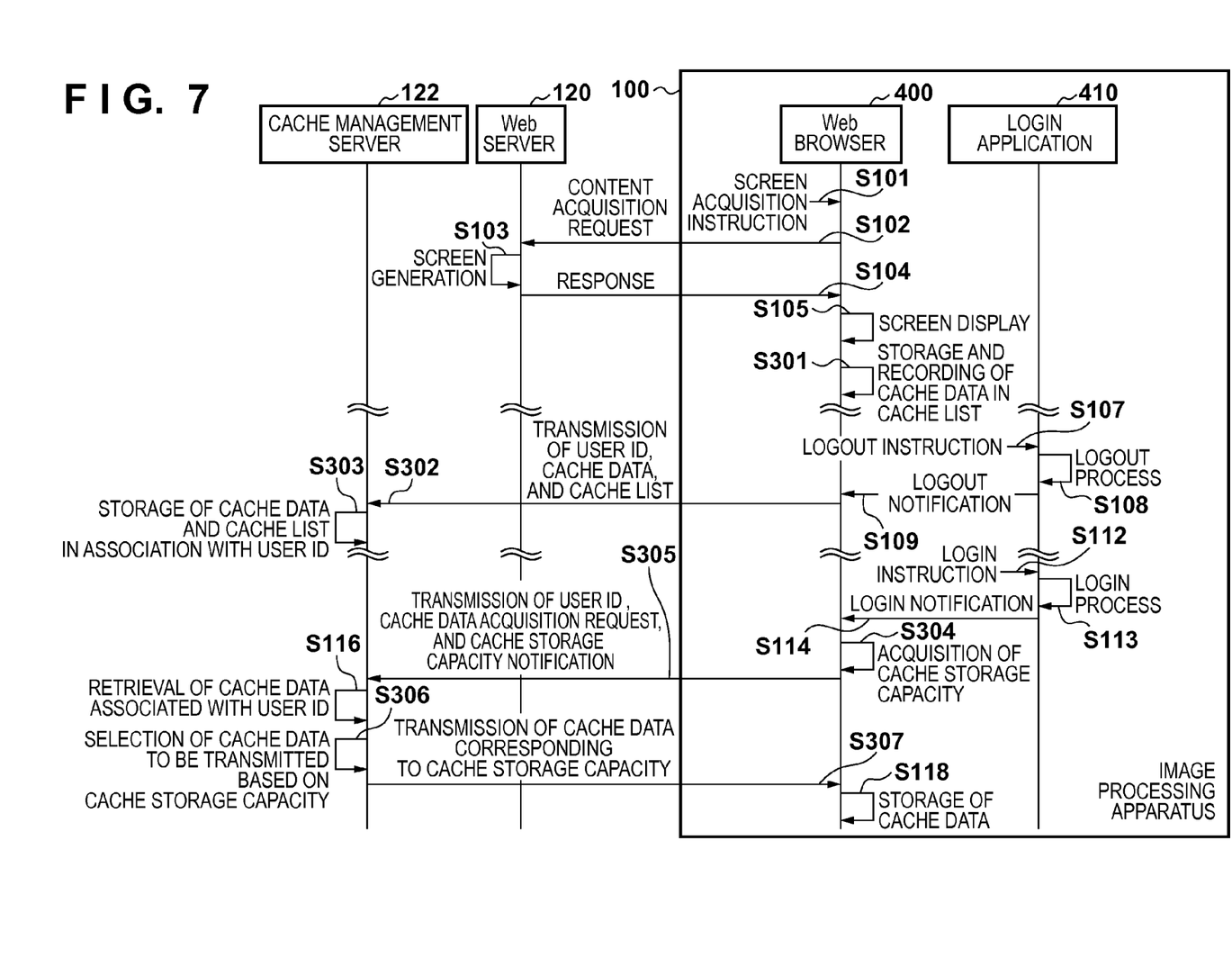
FIG. 7 is a sequence chart showing a process executed by an image processing system according to the third embodiment.

A series of processes executed by an image processing system according to this embodiment will be described with reference to FIG. 7. Although FIG. 7 illustrates a process executed by the image processing apparatus 100 of the image processing apparatuses 100 and 103, the same applies to a process executed by the image processing apparatus 103. An operation in each step shown in FIG. 7 is implemented on the image processing apparatus 100 or 103, a Web server 120, and the cache management server 122 by making a CPU 201 read out and execute a control program stored in a ROM 202 or an HDD 204, and making a CPU 301 read out and execute a control program stored in a ROM 302 or an HDD 304.

The same reference numerals as in the first embodiment (FIG. 5) denote steps in which the same processes are executed in FIG. 7. More specifically, steps S101 to S105, S107 to S109, S112 to S114, S116, and S118 are the same as in the first embodiment, and a description thereof will not be given as much as possible.

In step S301, a cache storing unit 404 stores (caches), in a RAM 203 or the HDD 204 as cache data, content data (for example, text data or image data) corresponding to the screen displayed on an operation unit 209 in step S105. At this time, the cache storing unit 404 adds a record associated with the stored cache data to a cache list 801 to update the cache list 801. Note that as in the first embodiment, if content data corresponding to the screen displayed on the operation unit 209 in step S105 has already been cached as cache data, the cache storing unit 404 need not cache the content data again. The cache storing unit 404 need not update the cache list 801, either.

Figure 8:
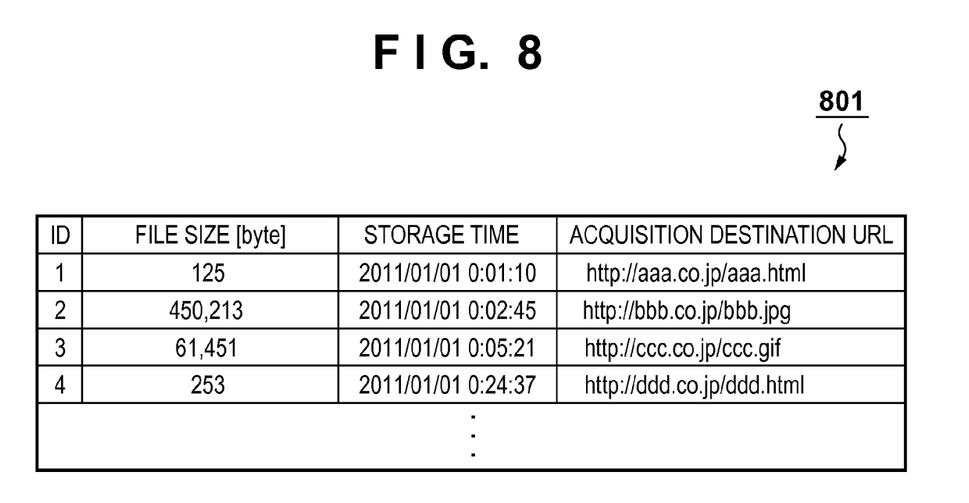
FIG. 8 is a table illustrating an example of a cache list 801 according to the fourth embodiment.

FIG. 8 illustrates an example (cache list 801) of the cache list held in each of the image processing apparatuses 100 and 103. The cache list 801 records information indicating, for example, the ID, file size, storage time, and acquisition destination URL for each cache data stored in the RAM 203 or the HDD 204. The storage time information corresponds to information indicating the time at which each cache data is stored in the image processing apparatus 100 or 103. The acquisition destination URL corresponds to address information for specifying a Web server and data at the acquisition destination of each cache data.

Every time the cache storing unit 404 stores cache data in the RAM 203 or the HDD 204, it adds a new item to the cache list 801 for the stored cache data to update the cache list 801. On the other hand, if cache data is erased from the RAM 203 or the HDD 204, the cache storing unit 404 deletes a corresponding item included in the cache list 801. In this way, the cache storing unit 404 updates the contents of the cache list 801 in accordance with the storage or deletion of cache data.

When the user then logs out of the image processing apparatus 100 to which the user has logged in, a Web browser 400 executes a process in step S302. In step S302, an external communication unit 401 transmits both the cache list 801 and the cache data, which are stored in the RAM 203 or the HDD 204, to the cache management server 122 together with the user ID notified in step S109.

When the cache management server 122 receives the cache data and cache list 801 from the image processing apparatus 100 together with the user ID in step S302, it executes a process in step S303. In step S303, a cache management unit 422 stores the user ID, cache data, and cache list 801 received in step S302 in a RAM 303 or the HDD 304 upon associating the user ID with the cache data and cache list 801. When the logged-out user then logs in to the image processing apparatus 100 again at a given timing, the image processing apparatus 100 executes a process in step S304. In step S304, the cache storing unit 404 acquires, from the RAM 203 or the HDD 204, a capacity (cache storage capacity) which can be used to store cache data in the image processing apparatus 100. The cache storage capacity may have a predetermined value or a value set by the user. Alternatively, the cache storage capacity may be determined from the remaining storage capacity of the RAM 203 or the HDD 204. The cache storage capacity corresponds to capacity information indicating the capacity which can be used to store cache data.

After the cache storage capacity is acquired, in step S305 the external communication unit 401 transmits a cache data acquisition request to the cache management server 122 together with the user ID notified in step S114. Also, in step S305, the external communication unit 401 notifies the cache management server 122 of the cache storage capacity acquired in step S304.

When the cache management server 122 receives the cache data acquisition request and cache storage capacity from the image processing apparatus 100 together with the user ID, it executes a process in step S116. In step S116, as in the first embodiment, the cache management unit 422 retrieves cache data associated with the user ID received from the image processing apparatus 100 in step S305 from the cache data stored in the RAM 303 or the HDD 304 in step S303. In step S306, the cache management unit 422 selects cache data to be transmitted to the image processing apparatus 100, based on the cache storage capacity received in step S305.

More specifically, the cache management unit 422 selects cache data to be transmitted, so that the total amount of cache data to be transmitted falls below the cache storage capacity in the image processing apparatus 100. For example, the cache management unit 422 selects cache data by referring to the cache list 801 stored in association with the user ID. More specifically, the cache management unit 422 sequentially selects cache data included in the cache list 801 from most recently stored data, so that the total amount of selected cache data falls below the cache storage capacity in the image processing apparatus 100.

After the selection process of cache data is completed, the cache management unit 422 transmits the selected cache data to the Web server 120 in step S307. Then, the image processing apparatus 100 stores and uses the cache data received from the cache management server 122, as in the first embodiment.

In this embodiment, the cache management server 122 transmits cache data to an image processing apparatus, to which the user has logged in, within the range of the cache storage capacity in the image processing apparatus, as described above. Hence, according to the third embodiment, it is possible to appropriately cope with the situation in which the individual image processing apparatuses 100 and 103 to which the user has logged in have different cache storage capacities, in addition to the advantage as in the first embodiment.

Fourth Embodiment

In the fourth embodiment of the present invention, image processing apparatuses 100 and 103 transmit no cache data to a cache management server 122, but the cache management server 122 generates cache data based on cache lists received from the image processing apparatuses 100 and 103. More specifically, the fourth embodiment is characterized in that the cache management server 122 acquires content data from a Web server 120 based on cache lists 801 received from the image processing apparatuses 100 and 103, and stores it as cache data. Note that only features different from the first and third embodiments will be described below for the sake of simplicity.

Figure 9:
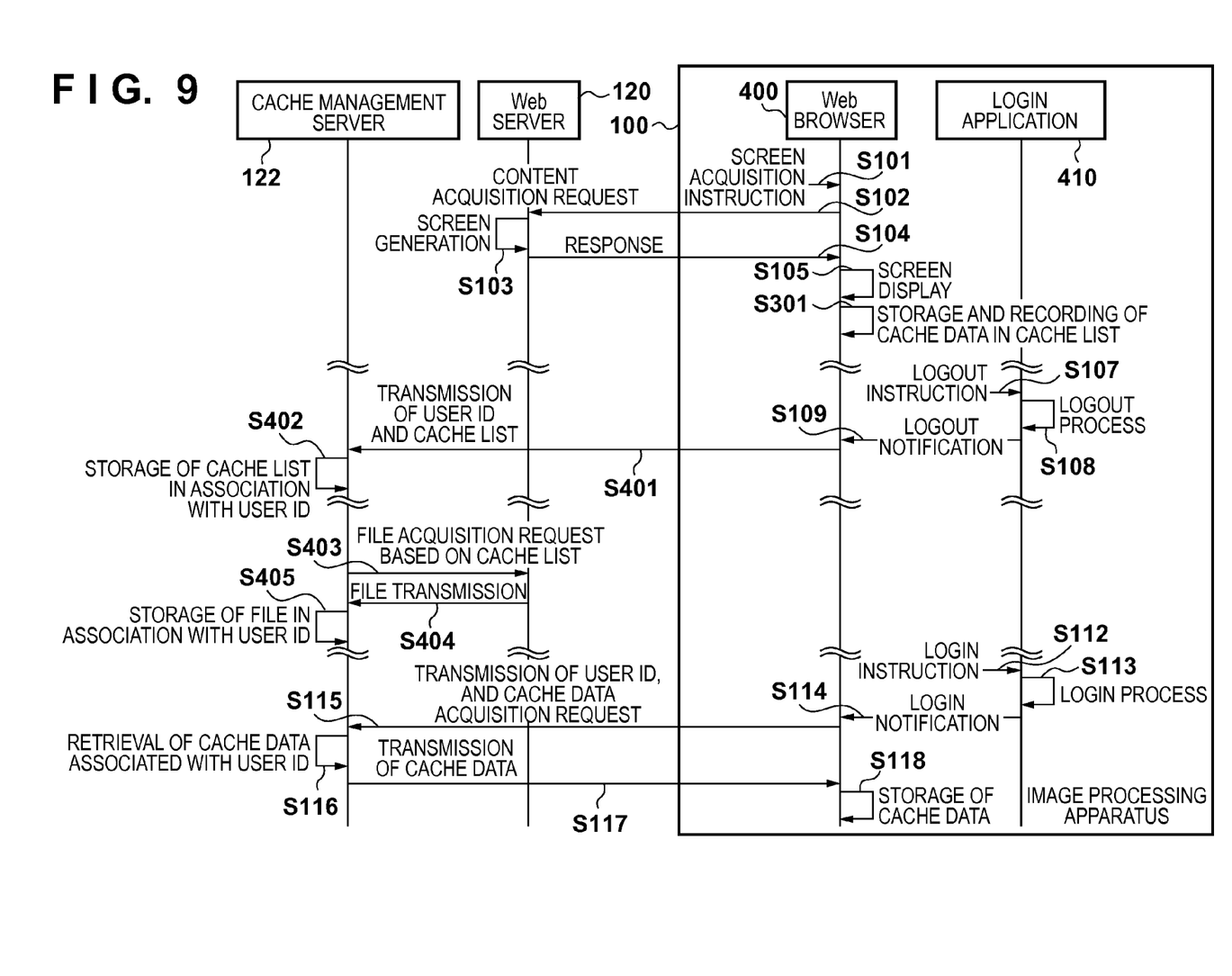
FIG. 9 is a sequence chart showing a process executed by an image processing system according to the fourth embodiment.

A series of processes executed by an image processing system according to this embodiment will be described with reference to FIG. 9. Although FIG. 9 illustrates a process executed by the image processing apparatus 100 of the image processing apparatuses 100 and 103, the same applies to a process executed by the image processing apparatus 103. An operation in each step shown in FIG. 9 is implemented on the image processing apparatus 100 or 103, the Web server 120, and the cache management server 122 by making a CPU 201 read out and execute a control program stored in a ROM 202 or an HDD 204, and making a CPU 301 read out and execute a control program stored in a ROM 302 or an HDD 304.

The same reference numerals as in the first embodiment (FIG. 5) and the third embodiment (FIG. 7) denote steps in which the same processes are executed in FIG. 9. More specifically, steps S101 to S105, S301, S107 to S109, and S112 to S118 are the same as in the first and third embodiments, and a description thereof will not be given as much as possible.

When the user then logs out of the image processing apparatus 100 to which the user has logged in, a Web browser 400 executes a process in step S401. In step S401, an external communication unit 401 transmits the cache list 801, which is stored in a RAM 203 or the HDD 204, to the cache management server 122 together with the user ID notified in step S109. Note that in this embodiment, the external communication unit 401 transmits no cache data to the cache management server 122 in step S401.

When the cache management server 122 receives the cache list 801 from the image processing apparatus 100 together with the user ID in step S401, it executes a process in step S402. In step S402, a cache management unit 422 stores the user ID and cache list 801 received in step S401 in a RAM 303 or the HDD 304 in association with each other.

The cache management server 122 then executes a process in step S403 at a given timing. In step S403, the cache management unit 422 transmits an acquisition request of a file corresponding to cache data to the Web server 120 specified based on the cache list 801 received in step S401. More specifically, the cache management unit 422 transmits an acquisition request of a file described in an acquisition destination URL included in the cache list 801 to the Web server 120 specified by the URL.

In response to the request transmitted in step S403, the Web server 120 executes a process in step S404. In step S404, a Web application 421 of the Web server 120 transmits the requested file to the cache management server 122 in response to the file acquisition request received in step S403.

When the cache management server 122 receives the file transmitted from the Web server 120, it executes a process in step S405. In step S405, the cache management unit 422 stores the file received from the Web server 120 in step S404 in the RAM 303 or the HDD 304 as content data in association with the user ID. Note that processes in steps S403 to S405 may be performed at predetermined time intervals or at timings set by the user.

As described above, in this embodiment, the image processing apparatus 100 transmits only a cache list to the cache management server 122 together with the user ID of the logged-out user, instead of transmitting cache data to the cache management server 122. The cache management server 122 acquires content data from the Web server 120 by itself and stores the acquired content data as cache data, instead of storing cache data from the image processing apparatus 100. At this time, the cache management server 122 acquires necessary content data from the Web server 120 based on the cache list received from the image processing apparatus 100. Hence, according to the fourth embodiment, it is possible to reduce the amount of data to be transmitted from the image processing apparatus 100 to the cache management server 122 upon logout of the user, in addition to the advantage as in the first embodiment.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-236477, filed Oct. 27, 2011, which is hereby incorporated by reference herein in its entirety.

What is claimed is:

1. An information processing system comprising:
a first information processing apparatus and a second information processing apparatus, which are respectively configured to display at least one of a screen based on screen data acquired from a Web server and a screen based on cache data of the screen data acquired from the Web server; and
a cache management server,
wherein the first information processing apparatus comprises:
a request unit configured to request of the Web server screen data of a screen to be displayed on a display unit of the first information processing apparatus;
a first storing unit configured to store the screen data acquired from the Web server as a response to the request by the request unit in a first storage unit of the first information processing apparatus as cache data; and
a first transmission unit configured to transmit a user ID of a user and the cache data stored in the first storage unit to the cache management server;
wherein the cache management server comprises:
a first receiving unit configured to receive the user ID and the cache data transmitted by the first transmission unit;
a second storing unit configured to store, in a second storage unit of the cache management server, the cache data received by the first receiving unit in association with the user ID received by the first receiving unit;
a second receiving unit configured to receive, from the second information processing apparatus, a user ID, a request of cache data, and a cache list indicating the cache data stored in a third storage unit of the second information processing apparatus; and
a second transmission unit configured to transmit, in accordance with the request received by the second receiving unit, cache data which is stored in association with the user ID received by the second receiving unit and is not indicated in the cache list received by the second receiving unit to the second information processing apparatus from among cache data stored in the second storage unit of the cache management server,
wherein at least one of the request unit, the first storing unit, and the first transmission unit is implemented by a processor and a memory, and
wherein at least one of the first receiving unit, the second storing unit, the second receiving unit, and the second transmission unit is implemented by a processor and a memory.

2. The system according to claim 1, wherein the second receiving unit further receives capacity information indicating a capacity which can be used to store cache data in the third storage unit of the second information processing apparatus, and
wherein the second transmission unit transmits cache data within a range of the capacity indicated by the capacity information received by the second receiving unit from among the cache data stored in association with the user ID received by the second receiving unit in the second storage unit of the cache management server.

3. The system according to claim 2, wherein the first transmission unit further transmits storage time information indicating a time at which each cache data stored in the first storage unit of the first information processing apparatus is transmitted to the cache management server, wherein the second storing unit stores the cache data and the storage time information in the second storage unit of the cache management server in association with the user ID, the cache data, and the storage time information transmitted by the first transmission unit, and wherein the second transmission unit transmits cache data from data whose storage time indicated by the storage time information is most recent, within a range of the capacity indicated by the capacity information received by the second receiving unit from among the cache data stored in association with the user ID received by the second receiving unit in the second storage unit of the cache management server.

4. The system according to claim 1, wherein the first information processing apparatus further comprises:

a setting unit configured to set whether or not transmission of the cache data stored in the first storage unit of the first information processing apparatus by the first transmission unit is to be restricted; and a restriction unit configured to restrict the transmission of the cache data stored in the first storage unit of the first information processing apparatus by the first transmission unit when restriction of the transmission of the cache data stored in the first storage unit of the first information processing apparatus is set by the setting unit.

5. A control method for an information processing system including a first information procession apparatus and a second information processing apparatus, which are respectively configured to display at least one of a screen based on screen data acquired from a Web server and a screen based on cache data of screen data acquired from the Web server, and a cache management server, the method comprising:

in the first information processing apparatus, requesting of the Web server screen data of a screen to be displayed on a display unit of the first information processing apparatus;

storing the screen data acquired from the Web server as a response to the request in a first storage unit of the first information processing apparatus as cache data; and transmitting a user ID of a user and the cache data stored in the first storage unit to the cache management server, and in the cache management server, receiving the user ID and the cache data;

storing, in a second storage unit of the cache management server, the received cache data in association with the received user ID;

acquiring, from the second information processing apparatus, a user ID, a request of cache data, and a cache list indicating the cache data stored in a third storage unit of the second information processing apparatus; and transmitting, in accordance with the acquired request, cache data which is stored in association with the acquired user ID and is not indicated in the acquired cache list to the second information processing apparatus from among cache data stored in the second storage unit of the cache management server.

* * * * *